FIG.2.

UNITED STATES PATENT OFFICE.

GEZA HORVATH AND GEORGE E. GREEN, OF WHEELING, WEST VIRGINIA.

CAP-HEMMING MACHINE.

1,022,552.  Specification of Letters Patent.  Patented Apr. 9, 1912.

Application filed July 25, 1910. Serial No. 573,676.

*To all whom it may concern:*

Be it known that we, GEZA HORVATH and GEORGE E. GREEN, citizens of the United States, residing at Wheeling, county of Ohio, State of West Virginia, have invented certain new and useful Improvements in Cap-Hemming Machines, of which the following is a specification, reference being had therein to the accompanying drawing.

This invention relates to a cap hemming machine and particularly to an apparatus for applying a ring of solder to the periphery of a can cap.

The invention has for an object to provide a novel and improved construction of machine by which a ring of solder is cut from a strip thereof and partially bent, the can cap fed and deposited within this ring which is applied or partially secured thereto, and subsequently fully securing the solder ring at the periphery of the cap and delivering the completed article, these several operations being so timed as to produce an automatic and continuous operation of the machine.

A further object of the invention is to provide an improved construction for cutting or punching the rings of solder of successively different sizes, such rings being cut concentric to each other to effect the economical use of the solder and rapid operation of the machine to apply these rings to caps of different sizes.

Other and further objects and advantages of the invention will be hereinafter set forth and the novel features thereof defined by the appended claims.

In the drawings Fig. 18 is a vertical section through the completed cap; Fig. 20 is a detail of the spiral cam for feeding the dial plate.

Like numerals of reference refer to like parts in the several figures of the drawings.

This machine comprises essentially means for feeding a strip or ribbon of solder and clamping it in position, means for cutting a plurality of rings from said solder and partially bending them to receive a cap, means for feeding a series of caps to these rings and depositing them therein, means for applying or partially securing the ring to the periphery of the cap, means for completely securing a ring to the cap and delivering the completed article, and means for automatically and continuously effecting the several operations.

Figure 7:
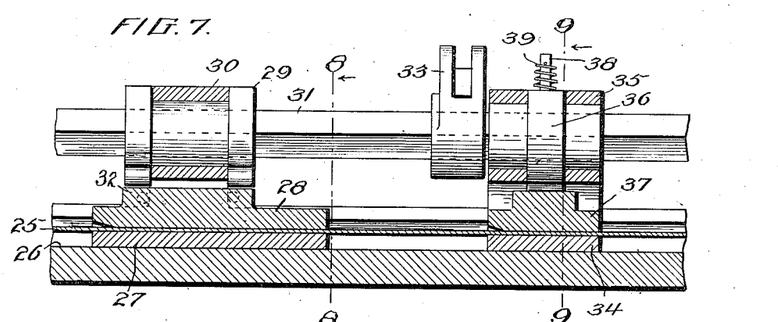
Fig. 7 is a vertical section of the solder feeding and retaining mechanism.
Figure 8:
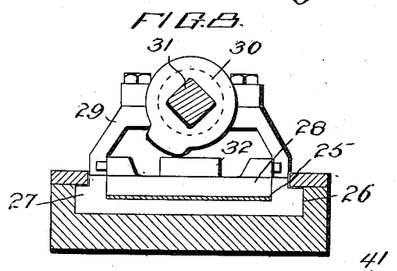
Fig. 8 is a section on line 8—8 of Fig. 7.
Figure 9:
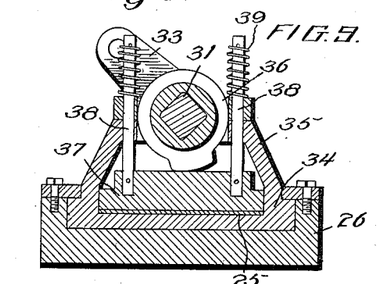
Fig. 9 is a similar view on line 9—9 of Fig. 7.

The numeral 25 indicates the solder strip or ribbon which is fed in a guide groove or way 26 (Fig. 7). This feeding is effected by a slide 27 mounted in the way 26 and carrying a clamping plate 28 as shown in Figs. 7 and 8 which is guided therein for sliding movement. The slide 27 is provided with the standards 29 which form a bearing for a rock shaft 31 which is preferably angular in cross-section and has slidingly mounted thereon a cam 30 coöperating with a block 32 upon the plate 28 to force said plate into gripping contact with the solder strip. The rock shaft 31 is actuated by a crank arm 33 which is connected as hereinafter described for intermittent movement.

Figures 10, 11:
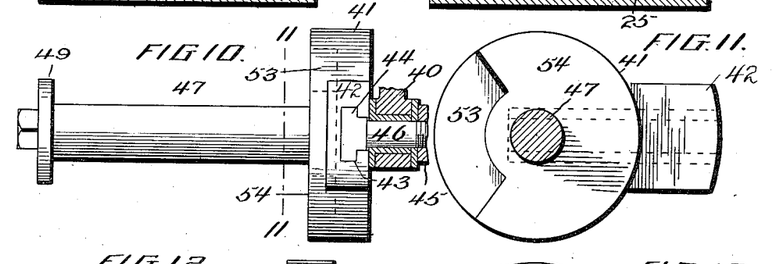
Fig. 10 is a detail elevation of the solder feeding cam.
Fig. 11 is a section on line 11—11 of Fig. 10.
Figure 12:
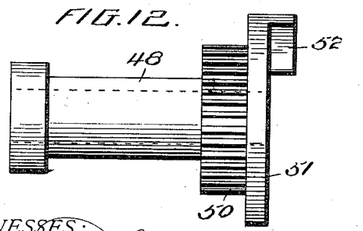
Fig. 12 is a detail elevation of the driving connection for the solder feeding cam.
Figure 13:
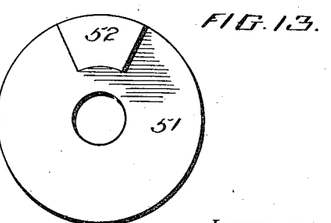
Fig. 13 is an elevation of the right end of this connection.

Coöperating with the feed slide is a clamp for the solder strip during the return movement of the slide. This clamp comprises a base plate 34 fixed within the guide way 26 provided with standards 35 which form a bearing for the rock shaft 31 and upon this shaft a cam 36 is secured. This cam coöperates with a clamping plate 37 which is guided in its vertical movement by posts 38 extending through the standards 35 and provided above said standards with tension springs 39 secured to the posts and bearing upon the standards to lift the plate 37 from contact with the solder strip when the cam 36 is moved out of contact with said plate. The cam 30 operates in alternation with the cam 36 so that the latter releases its clamping plate when the slide moves toward the clamp and the slide cam releases its plate during a movement in the opposite direction at which time the cam 36 holds the strip during the return movement. The feeding of the slide may be effected in any desired manner, for instance by the pitman 40 pivoted thereto and to the feed cam 41. This feed cam is formed with an extension 42 having a slot 43 extending radially from the axis of the cam and adapted to receive an adjustable block 44 upon which the pitman 40 is pivoted. This block 44 is clamped in any desired position by means of a nut 45 carried by the bolt 46 extending therefrom as shown by detail in Fig. 10. This permits an adjustment of the length of stroke of the pitman and the feed slide carried thereby. The cam 41 is provided with a shaft 47 over which a sleeve 48 is disposed (Fig. 12), and secured thereon by means of a washer plate 49. The sleeve 48 is provided with a driving gear 50 and a connecting plate 51 which is formed upon one face with a lug 52 adapted to operate within a segmental recess 53 upon the adjacent inner face 54 of the cam 41, these parts being shown in detail in Figs. 11, 12 and 13. This construction permits a period of rest during the operation of the cam which is necessary during the cutting of the solder strip. The gear 50 is driven by a sector 55 mounted at 56 upon the shaft 57 having a bearing 58 upon the machine frame. The sector 55 is oscillated by means of the pitman 59 pivoted thereto and to the crank 60 carried by a countershaft 61 mounted in the frame of the machine and having at one end a driving pinion 62 which meshes with a coöperating pinion 63 upon the main driving shaft 64.

Figures 14, 19:
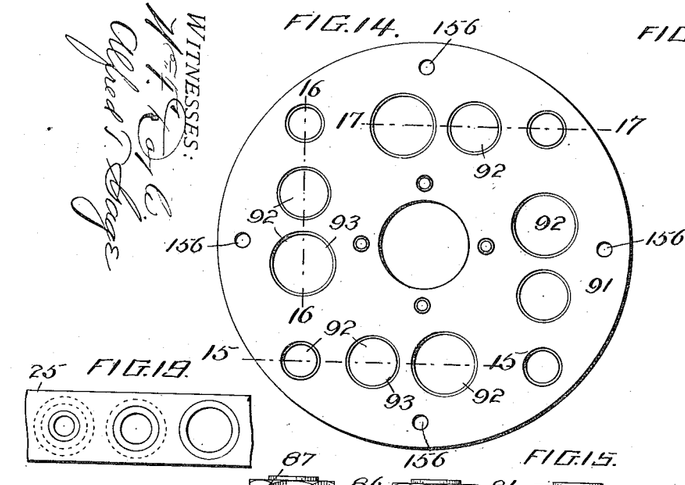
Fig. 14 is a plan of the dial plate.
Fig. 19 is a diagram showing the relative positions of the successive rings cut from the solder ribbon.

The solder rings are cut from the strip 25 concentric to each other to produce a plurality of rings of different sizes as shown by the diagram in Fig. 19. The smallest ring is first cut and the strips then moved beneath a cutter for the next larger size, this operation being continued to the capacity of strip.

Figures 1, 1B:
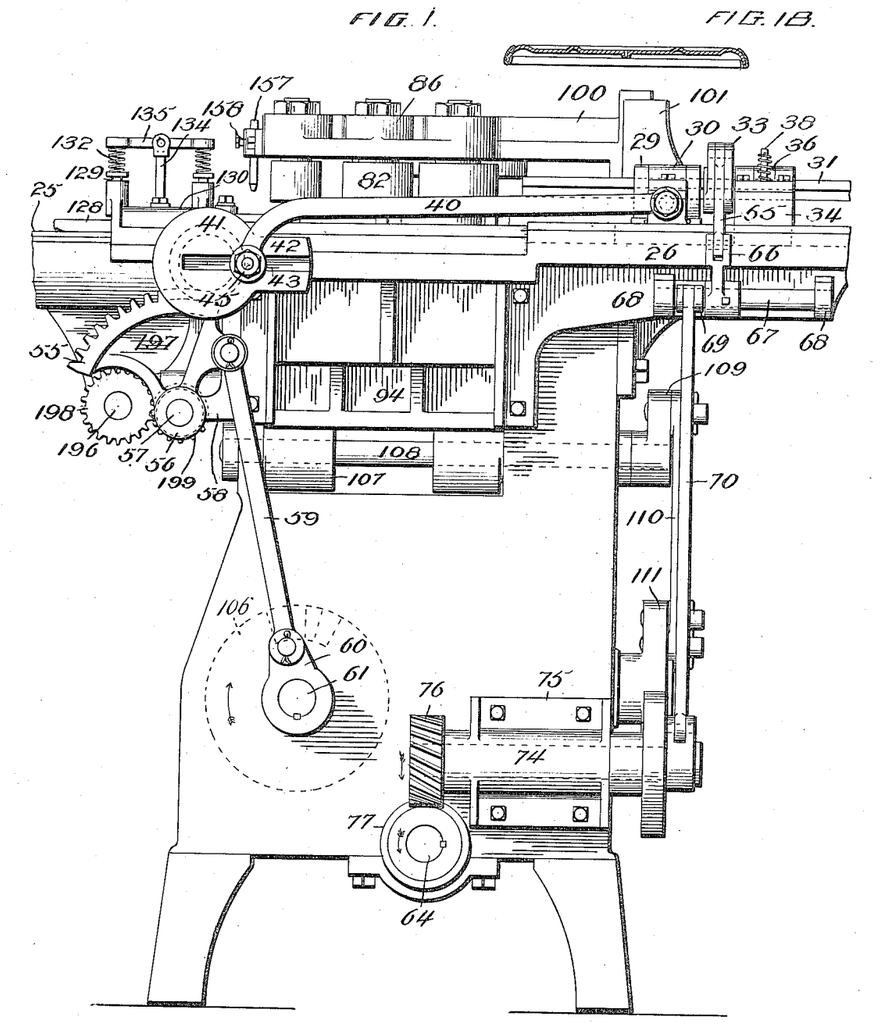
—Figure 1 is a front elevation of the machine.
Figures 4, 21:
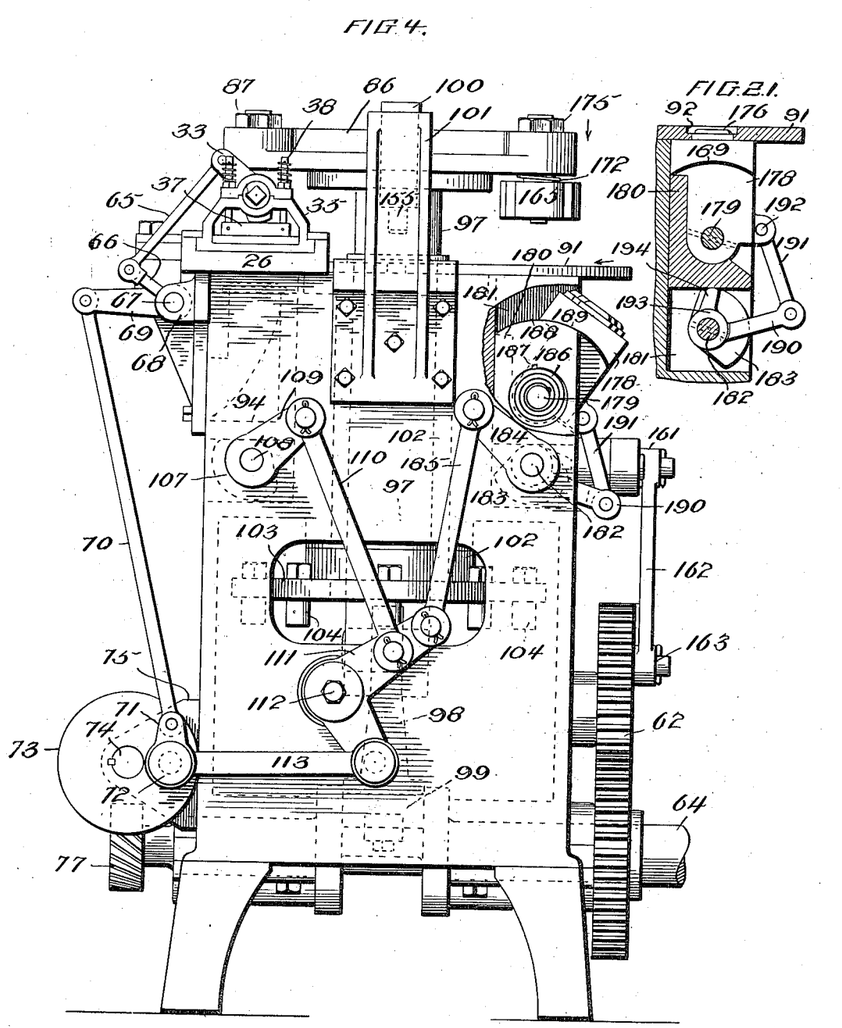
Fig. 4 is an elevation of the machine from that opposite end of the machine from that shown in Fig. 2.
Fig. 21 is a vertical section of the means for operating one securing die for delivering the completed article.

The shaft 31 by which the clamps of the solder strip slide and clamp are actuated, may be oscillated by any desired connection, for instance as shown in Figs. 1 and 4 where the arm 33 secured to the shaft 31 is provided with a link 65 pivoted thereto and to a crank arm 66 on the rock shaft 67 which is pivoted in the bearings 68 on the machine frame. The shaft 67 carries a lever arm 69 from which a connecting rod 70 extends to a crank 71 eccentrically mounted at 72 upon the disk 73 carried by the shaft 74. This shaft is mounted in a bearing 75 and provided with a worm gear 76 meshing with a coöperating gear 77 carried by the main driving shaft 64.

Figure 15:
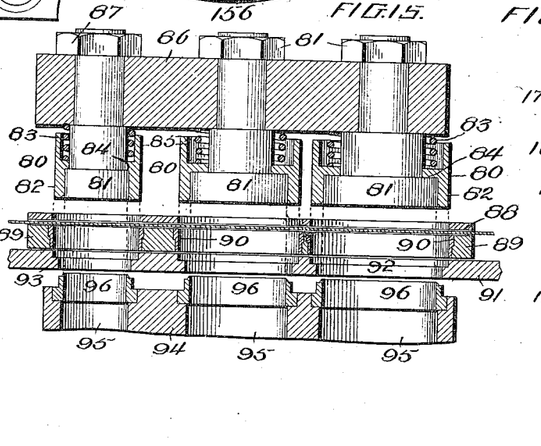
Fig. 15 is a vertical section of the solder cutting and bending dies coöperating with the dial plate on line 15—15 of Fig. 14.

The punching or cutting action to form the solder rings is effected by a series of reciprocating upper dies 80 each of similar construction but of successively increasing size. These dies each comprise an inner punch portion 81 and an outer movable punch 82 mounted thereon and normally held by the tension spring 83 in contact with a shoulder 84 upon the punch 81. This spring surrounds the body of the punch 81 and is disposed within a recess of the movable outer punch 82. The punch 81 is secured in position in the head plate 86 by means of nuts 87 or other suitable means as shown in Fig. 15. Beneath these punches, a stripper plate 88 is secured and coöperates with the stationary frame 89 upon which it is mounted. This frame has an inner cutting edge 90 at the periphery of each of the openings therethrough. Beneath the stripper plate and cutter, a dial plate 91 is pivotally supported and provided with a series of apertures 92 of successively increasing size each being provided with a supporting shoulder 93. These apertures correspond in size to the diameter of ring to be cut and retain both the ring and the cap during its travel through the machine. As shown in Fig. 14, the dial plate is provided with four series of these apertures in order to maintain a continuous operation as will be hereinafter described. Beneath the dial plate, a punch head 94 is mounted for movement toward and from the said plate. This head is provided with a series of discharge passages 95 by which any excess material may fall after the punching operation. Surrounding each of the apertures is an inner cutting ring 96 which coöperates with the punch 81, while the outer cutting edge 90 coöperates with the punch 82.

The head 86, carrying the upper punches, is carried by a reciprocating plunger 97, extending downward through the machine and connected by a pivoted pitman 98 with a crank 99 upon the main driving shaft 64 as shown by dotted lines in Fig. 4. The head is also provided with a guide arm 100 adapted to slide in a guide 101 mounted upon the frame of the machine as shown in Figs. 1 and 4.

Figure 2:
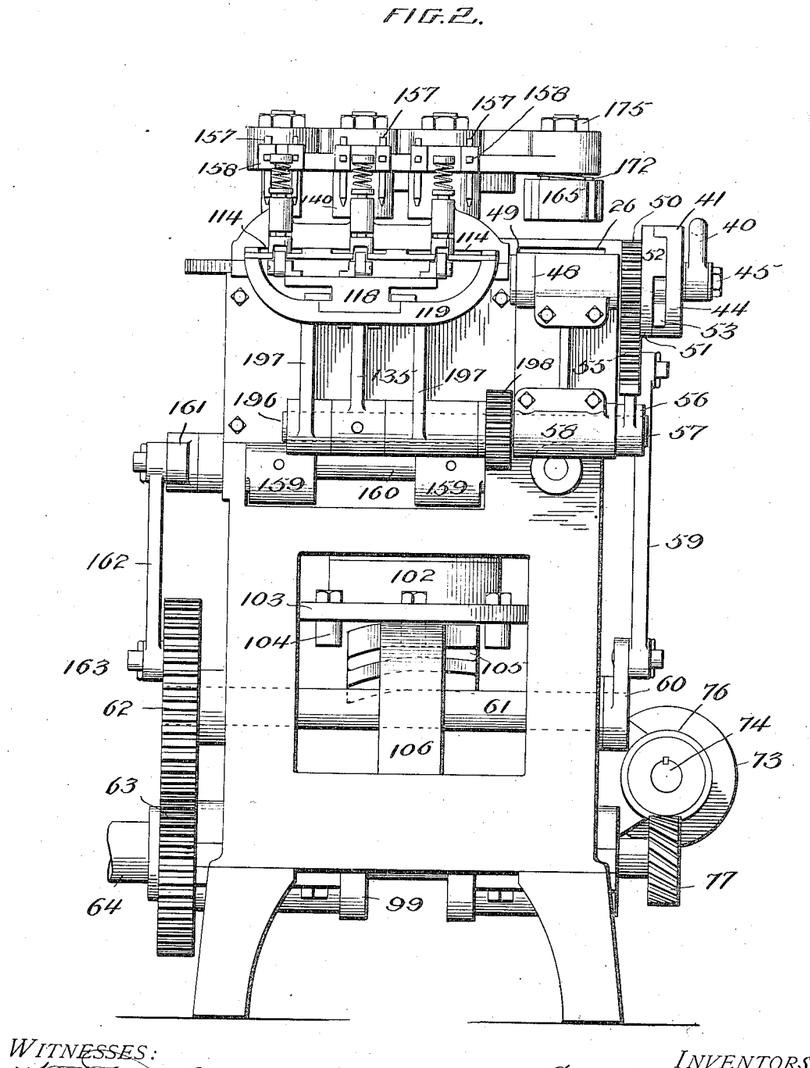
Fig. 2 is an end elevation at the feed end thereof.
Figure 2D:
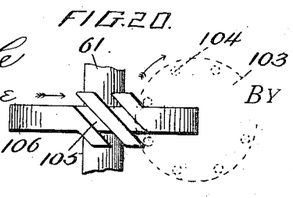

The dial plate 91 is rotated by means of a depending sleeve 102 which surrounds the plunger 97 and is provided at its lower end with a cam plate 103 having a series of spaced contacts 104 adapted to engage and traverse the spiral paths 105 carried by the cam 106 which is mounted upon the countershaft 61 before described, as shown in Figs. 2 and 20.

The punch head 94 is raised into operative position by cams 107 disposed beneath the head as shown in Figs. 1 and 4. These cams are mounted upon a shaft 108 which is provided at its outer end with a crank arm 109 connected by a link 110 with a bell crank lever 111 pivotally mounted at 112. The opposite arm of this lever is connected by a link 113 with the eccentric connection 72 upon the disk 73.

Figure 5:
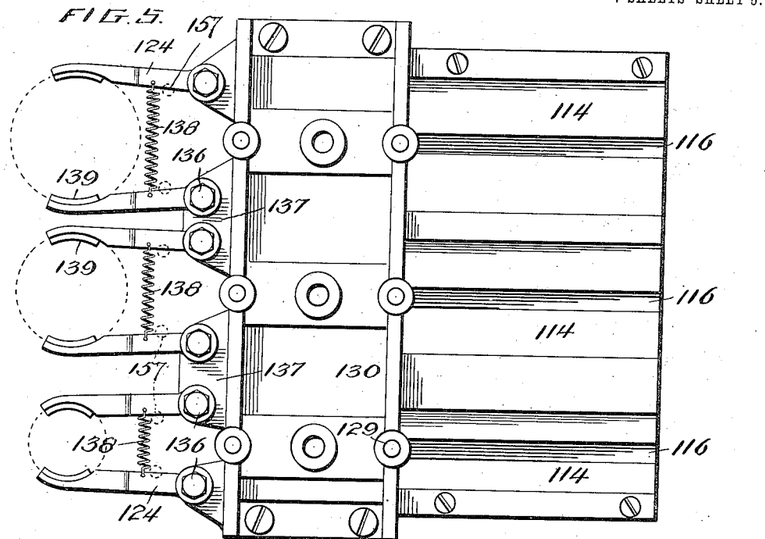
Fig. 5 is a detail plan of the cap holding fingers.
Figure 6:
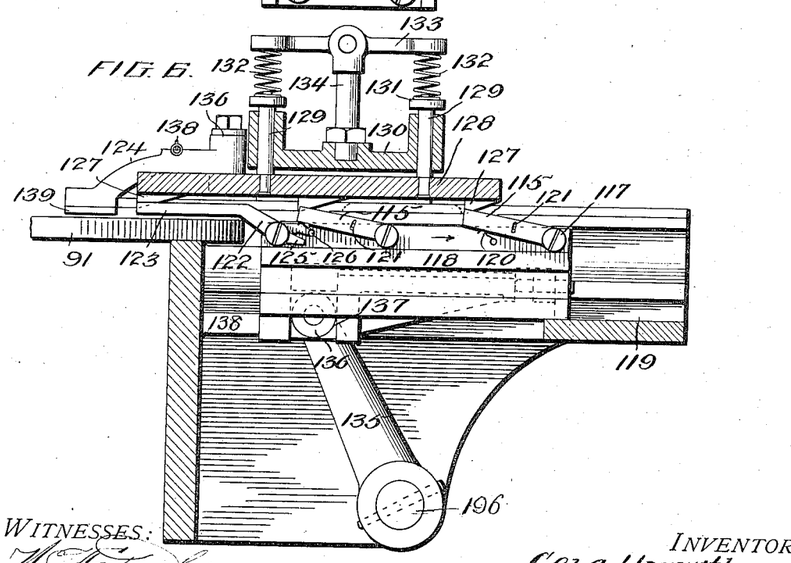
Fig. 6 is a detail vertical section of the cap feeding and retaining mechanism.
Figure 16:
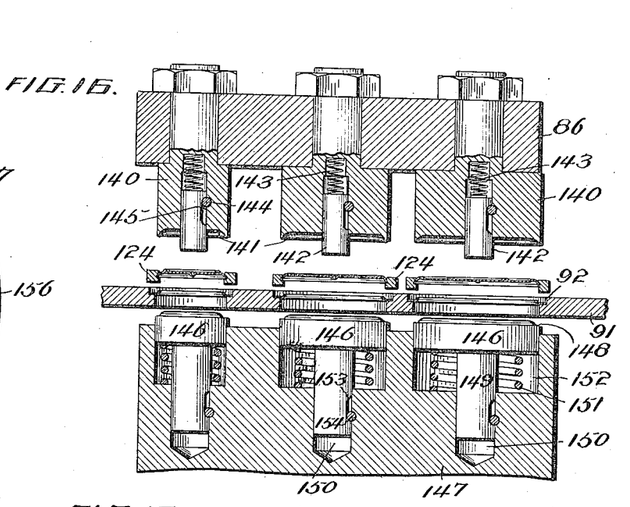
Fig. 16 is a similar view of the solder applying dies coöperating with said plate on line 16—16 of Fig. 14.
Figure 17:
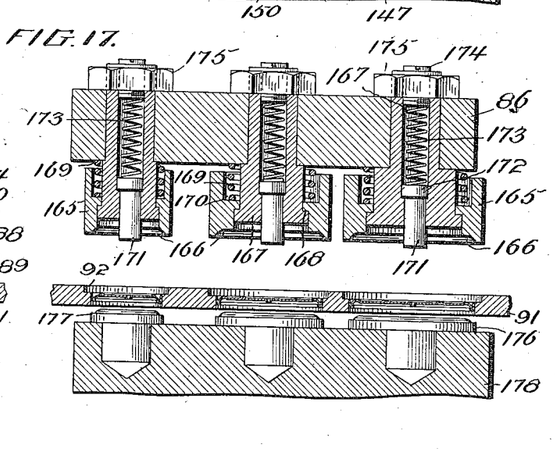
Fig. 17 is a similar view of the solder securing dies coöperating with said plate on line 17—17 of Fig. 14.

The solder ring, when punched and bent by the punches 81, 82 and 96 is of the form shown in Fig. 16 and rests upon the supporting shoulder 93 of the dial plate. It is carried from beneath the punches mentioned into alinement with the ring applying dies by a quarter rotation of the dial plate. When in this position, a series of cam caps are fed into position, they being of sizes corresponding to the diameter of the rings. This feeding is accomplished by a series of ways 114, each of similar construction but differing in dimensions relative to the diameter of the cap to be fed. The caps are introduced into these ways in any desired manner and are fed forward by a series of feed dogs 115 operating in each way and projecting upward through a slot 116 in the base thereof as shown in Figs. 5 and 6. These dogs are pivotally mounted at 117 upon a sliding carriage 118 mounted in an extension 119 of the frame (Fig. 2). The dogs 115 are held in raised position by means of a spring 120 bearing against the under face thereof and are limited in their vertical movement by means of a pin and slot 121. The final feed dog 122 is formed with a horizontally disposed free end 123 to feed the cap between the holding jaws 124. The opposite end of the dog 122 is formed with a tail 125 against which the spring 126 acts with a downward pressure to raise the free end 123 thereof (Fig. 6). Above the feed dogs and coöperating therewith are a series of holding dogs 127 carried by a plate 128 and yieldingly mounted by means of the posts 129 extending through the arch frame 130. The caps 131 of these posts contact with a tension spring 132 which bears at its opposite end against an arm 133 carried by the standard 134 which is mounted in the arch frame 130. The carriage 118 is reciprocated by means of a rock arm 135 carrying at its upper end a friction roller 136 mounted in a vertically disposed groove 137 upon the underside of the carriage at one end thereof. This arm operates within a slot or opening 138 formed in the extension 119 for that purpose. The arm 135 is secured to the shaft 196 which is given an oscillating movement by the means driving the sector for the solder strip feed above described. This shaft is supported in hangers 197 and carries a gear 198 which meshes with a gear 199 secured upon the shaft 57. These gears have only an oscillatory travel equal to that of the sector. The holding arms 124 are pivotally mounted at 136 upon lugs 137 extended from the arch frame 130 and are connected together by a tension spring 138. The free ends of these arms are formed concave as at 139 and are adapted to grasp the sides of the cap and retain it in alinement with the solder rings carried by the dial plate beneath. In this construction, the caps are engaged by the feed dogs and forced beneath the holding dogs which yield for that purpose so that they are successively moved forward until forced by the final dog into the holding jaws where they are held above the recesses of the dial plate 91 as shown in Fig. 16. Above the holding arms 124, a series of applying dies 140 is mounted in the head 86. These are similar in construction and each provided with a concave under face 141 to engage and force the cap into position within the ring and have centrally disposed therein a sliding plunger 142 held under tension by a spring 143 and limited in its travel by a pin 144 coöperating with a recess on a face of the plunger, as shown in Fig. 16. This plunger is placed under tension when the dies are in contact with the cap and ring and causes the caps to be released from the dies by the outward movement of the plunger. The coöperating lower dies 146 are carried by a reciprocating head 147 and each provided with a convex face 148 adapted to coöperate with the face 141 of the upper dies. The lower dies 146 have a stem 149 extending therefrom into a recess 150 formed in the head 147. They are normally held in raised position by means of the tension spring 151 disposed in the recess 152 of the head. The movement of the lower dies is limited by means of the recess 153 upon one face thereof which coöperates with the fixed pin or projection 154. During the operation of these dies and other members carried by the head 86, the dial plate 91 is locked in position by means of a pin 155 carried thereby and entering a recess 156 in the dial plate as shown by dotted lines in Fig. 4. The downward movement of the head 86 also releases the holding arms 124 by means of properly spaced pins 157 adjustably carried in sockets 158 upon the head and adapted to engage the inner face of the arms as shown in Fig. 5. These releasing pins are spaced from each other relative to the diameter of cap carried by the arms to release them. The lower die head 147 is raised by means of cams 159 secured upon the shaft 160 which carries at its outer end a crank arm 161 from which a pitman 162 extends to a crank or eccentric connection 163 on the gear 62 upon the shaft 61. The result of the action of these dies is to apply the cap within the solder ring as shown in Fig. 17 and to force it below the shoulder 92 of the dial plate 91. This plate is then fed a quarter rotation to bring the caps beneath the securing dies.

A series of upper securing dies 165 of different sizes, each similar in construction, is mounted upon the head 86. These dies are provided with a concave bending face 166 and mounted upon a tubular securing post 167 which is formed with a shoulder 168, to limit the movement of the die away from the head. The die is held in this position by means of the tension spring 169 disposed within the recess 170 thereof and bearing against both the head and die (Fig. 17). The releasing plunger 171 is also mounted in the post 167 and is provided with a head 172 to limit its outward movement, while it is held in that position by means of a tension spring 173 disposed within the post and bearing at its upper end against an adjustable screw 174 threaded into the post. The posts are secured in position upon the head by means of the nuts 175. The lower securing die 176 is provided with a convex face 177 to coöperate with the concave face 166 and is mounted in a reciprocating head 178 which is also capable of oscillatory movement for discharging the completed hemmed cap therefrom. The action of these dies is to compress the solder ring about the periphery of the cap by contact of the opposite dies therewith. The upper die being yieldingly mounted to prevent injury to the article, while the plungers release the caps from the upper dies, leaving them resting upon the lower dies from which they are discharged.

Figure 3:
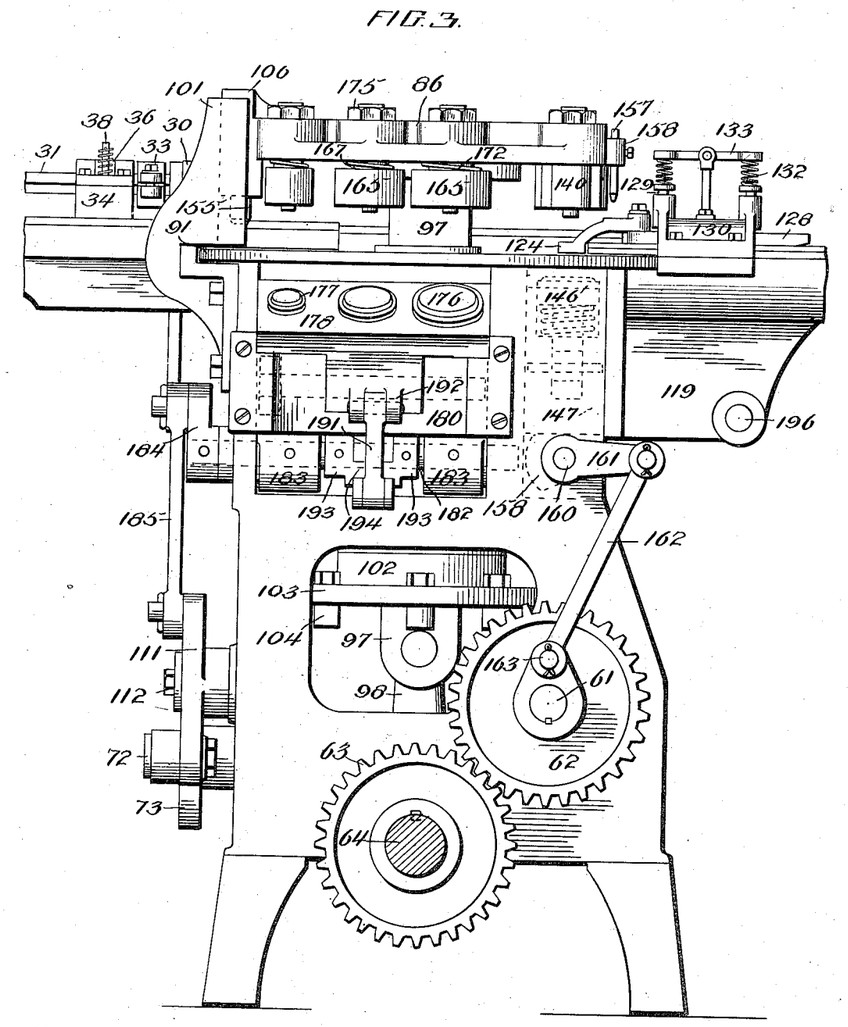
Fig. 3 is a rear side elevation at the delivery end of the machine.

The die head 178 is pivotally mounted at 179 in the slide block 180 mounted in the vertical way 181 at the delivery side of the frame. Beneath this block, the shaft 182 is pivoted and has secured thereto a cam 183. The shaft is provided at its end with a crank arm 184 connected by a link 185 with an arm of the bell crank lever 111 above described. This connection effects an oscillation of the cam to raise the dies into the position shown in Fig. 21. The swinging movement of the head 178 for the purpose of discharging the completed cap, shown in Fig. 18, is controlled in the continued movement of the shaft 182 before and after the action of the cam in raising and lowering the head, respectively. The head is normally held in vertical position by means of a tension spring 186 secured to the pivot 179 and to the slide block at 187 so as to be placed under tension as the head swings outward. The upper edge of the block 180 is curved at 188 to coöperate with a similar face 189 upon the head to form a guide for the swinging movement. This movement is produced by a lever 190 loosely mounted upon the shaft 182 and connected by a link 191 to a pivoting lug 192 upon the head 178. At opposite sides of the lever 190, a strike arm 193 is secured to the shaft 182 and has a portion 194 disposed to engage said lever in the oscillation of the shaft 182 as shown in Fig. 3. With the head in raised position, as shown in Fig. 21, an oscillation of the shaft 182 first withdraws the cams from beneath the sliding block, permitting its downward movement and the continued travel of this shaft brings the strike arm 193 into contact with the loosely pivoted lever 190, thus moving the latter downward and swinging the head outward to place its spring under tension and deliver the completed article therefrom (Fig. 4). In the returning or opposite travel of the shaft 182, the strike arm is first removed from the lever and the spring connection between the head and slide block draws the former into vertical position and the cam effects the reciprocation of the parts.

In the operation of the machine, the solder strip is fed as described beneath the cutting punches and a series of rings of different sizes produced. The clamp for the strip is then released and it is fed forward the distance of one punch so as to cut the next size ring concentric to the aperture remaining after the cutting of the previous ring as illustrated in Fig. 19. This cutting operation also bends up the inner edge of the ring and leaves it in the dial plate which is then given a quarter rotation to bring the rings in position to receive the caps. These caps are fed as shown in Fig. 6 and retained in alinement with the rings by the holding arms. The main head is then again reciprocated and the applying dies approach each other during which movement, the holding arms are opened, permitting the cap to drop into place within the ring and the movement of the dies then bends upward the outer edge of the ring into the position shown in Fig. 17, also removing it and the cap from the seat in the dial plate. This plate is then given a further quarter revolution to bring the caps into alinement with the securing dies which approach each other and bend and hem the ring upon the periphery of the cap as shown in Fig. 18. In the retracting movement of these dies, the lower die is automatically swung outward to deliver the completed article.

The machine is arranged for a continuous automatic operation and by a proper arrangement of the size of dies, may produce hemmed caps of different sizes or of the same size while the movement of the parts is so timed and connected to a main driving shaft as to effect the proper succession of operation in the minimum of time and with the most economical use of the solder owing to the cutting of successive rings concentric to each other.

Having described our invention and set forth its merits, what we claim and desire to secure by Letters Patent is—

1. In a cap hemming machine, a reciprocating head provided with a series of cutting punches of different sizes, and means for intermittently feeding a solder strip the distance of one punch between each punching operation to cut a ring concentric with the aperture of the previous operation.

2. In a cap hemming machine, means for automatically and successively cutting a series of solder rings one about the other.

3. In a cap hemming machine, a head provided with a cutting punch, a slide member adapted to feed a solder strip, means carried by said member to engage said strip in the movement of the slide in one direction, means for reciprocating said slide, and an automatically operated clamp engaging said strip during the return stroke of said slide member.

4. In a cap hemming machine, a head provided with a cutting punch, a slide member adapted to feed a solder strip, means carried by said member to engage said strip in the movement of the slide in one direction, a pitman extending from said slide member, an operating cam for said pitman, and means for adjusting the pitman connection radially to the axis of said cam.

5. In a cap hemming machine, a head provided with a cutting punch, a slide member adapted to feed a solder strip, means carried by said member to engage said strip in the movement of the slide in one direction, a pitman extending from said slide member, an operating cam for said pitman having a segmental recess upon one face, and a driving gear mounted upon the axis of said cam and provided with a lug entering said recess to travel therein.

6. In a cap hemming machine, a head provided with a cutting punch, a slide member adapted to feed a solder strip, means carried by said member to engage said strip in the movement of the slide in one direction, a pitman extending from said slide member, an operating cam for said pitman having a segmental recess upon one face, a sleeve mounted upon the axis of said cam and provided with a driving pinion thereon, and a plate carried by said sleeve and having a lug entering said recess and constructed to permit a period of rest in the operation of said cam.

7. In a cap hemming machine, a head provided with a cutting punch, means for intermittently feeding a solder strip, a clamping device for said strip comprising a base having standards thereon, a plate disposed to clamp said strip, and a shaft having a cam to engage the upper face of said plate.

8. In a cap hemming machine, a head provided with a cutting punch, means for intermittently feeding a solder strip, a clamping device for said strip comprising a base having standards thereon, a plate disposed to clamp said strip, a shaft having a cam to engage the upper face of said plate, posts extended upward from said plate, and springs disposed upon said posts to raise said plate.

9. In a cap hemming machine, a cutting punch, a slide member provided with means to engage a solder strip and mounted for sliding movement thereon, a clamp through which said strip extends, and means for operating the clamping devices of the slide member and clamp in alternation.

10. In a cap hemming machine, a reciprocating head provided with a cutting punch for a solder ring, means for feeding a cap, a dial plate intermittently movable for transferring said ring into alinement with said cap, a coöperating cutting punch beneath said dial plate and movable in unison with the first mentioned punch, opposite reciprocating dies for bending said ring upon the periphery of said cap, and means for oscillating the lower die to deliver an article therefrom.

11. In a cap hemming machine, a stripper frame, means for feeding a solder strip therethrough, a cutting edge surrounding an aperture in said frame, a rigid punch, means for moving said punch toward and from said frame, a yielding punch mounted upon said rigid punch, a coöperating punching head disposed beneath said frame in alinement with said rigid and yielding punch, and a dial plate having an aperture disposed in alinement with that of the stripper frame.

12. In a cap hemming machine, a stripper frame, means for feeding a solder strip therethrough, a cutting edge surrounding an aperture in said frame, a rigid punch, means for moving said punch toward and from said frame, a yielding punch mounted upon said rigid punch, a coöperating punching head disposed beneath said frame in alinement with said rigid and yielding punch, a projection upon said yielding punch adapted to engage a shoulder upon the rigid punch to limit the outward travel of the former, and a tension spring for moving said yielding punch outwardly.

13. In a cap hemming machine, a stripper frame, means for feeding a strip of material therethrough, a cutting edge surrounding an aperture in said frame, a reciprocating head, a rigid punch mounted in said head, a slidable annular punch mounted upon said rigid punch, a tension spring disposed between the sliding punch and head, and an opposite movable punch coöperating with said rigid and sliding punches.

14. In a cap hemming machine, a head provided with a series of punches, a reciprocating plunger carrying said head, a driving shaft having a crank connected to said plunger, a slide block carried by said head, a fixed guide coöperating with said block, a dial plate disposed beneath said punches and provided with apertures therein, a retaining member carried by said head to enter said apertures, a cam plate provided with a series of spaced contacts and connected to said dial plate, and a spiral cam disposed to engage said contacts.

15. In a cap hemming machine, a dial plate provided with a series of apertures, independent means coöperating with said apertures, a cam plate connected to said dial plate and provided with spaced contact points about the periphery thereof, and a spiral cam having a plurality of tracks to successively engage said contacts.

16. In a cap hemming machine, a dial plate, a reciprocating member disposed above said plate, a coöperating reciprocating member beneath said plate, a rock shaft provided with a cam to raise said coöperating member, and means for actuating said rock shaft.

17. In a cap hemming machine, a dial plate, a reciprocating member disposed above said plate, a coöperating reciprocating member beneath said plate, a rock shaft provided with a cam to raise said coöperating member, a crank arm mounted on said rock shaft, a link extending from said arm, a bell crank lever connected to said link, a driven disk, and a link extending from the bell crank lever and eccentrically connected to said disk.

18. In a cap hemming machine, a dial plate, a reciprocating member disposed above said plate, a coöperating reciprocating member beneath said plate, a rock shaft provided with a cam to raise said coöperating member, a crank arm mounted on said rock shaft, a link extending from said arm, a bell crank lever connected to said link, a driven disk, a link extending from the bell crank lever and eccentrically connected to said disk, a securing die mounted for reciprocating and oscillating movements, a rock shaft beneath said die provided with a lifting cam, means carried by said shaft for producing an oscillation of said die, and a connection from said shaft to said bell crank lever.

19. In a cap hemming machine, a dial plate, a reciprocating member disposed above said plate, a coöperating reciprocating member beneath said plate, a rock shaft provided with a cam to raise said coöperating member, a crank arm mounted on said rock shaft, a link extending from said arm, a bell crank lever connected to said link, a driven disk, a link extending from the bell crank lever and eccentrically connected to said disk, a securing die mounted for reciprocating and oscillating movements, a rock shaft beneath said die provided with a lifting cam, means carried by said shaft for producing an oscillation of said die, a connection from said shaft to said bell crank lever, solder strip feeding and clamping means, a rock shaft for actuating said means, and connections from said rock shaft to the eccentric connection upon the driven disk.

20. In a cap hemming machine, means for applying a solder ring to a cap, a cap feeding way, a slide disposed beneath said way and provided with dogs thereon, a coöperating plate provided with holding dogs, and means for reciprocating said slide.

21. In a cap hemming machine, means for applying a solder ring to a cap, a cap feeding way, a slide disposed beneath said way and provided with dogs thereon, a coöperating plate provided with holding dogs, means for reciprocating said slide, and cap holding fingers disposed at the delivery from said feed dogs.

22. In a cap hemming machine, means for applying a solder ring to a cap, a cap feeding way, a slide disposed beneath said way and provided with dogs thereon, a coöperating plate provided with holding dogs, means for reciprocating said slide, cap holding fingers disposed at the delivery from said feed dogs, and means carried by said ring applying means for automatically releasing said fingers.

23. In a cap hemming machine, means for applying a solder ring to a cap, a cap feeding way, a slide disposed beneath said way and provided with dogs thereon, a coöperating plate provided with holding dogs, means for reciprocating said slide, cap holding fingers disposed at the delivery from said feed dogs, and means for mounting said holding dogs for yielding vertical movement.

24. In a cap hemming machine, means for applying a solder ring to a cap, a cap feeding way, a slide disposed beneath said way and provided with dogs thereon, a coöperating plate provided with holding dogs, means for reciprocating said slide, cap holding fingers disposed at the delivery from said feed dogs, posts extended upward from said plate, and tension springs extending between said posts and a fixed arm.

25. In a cap hemming machine, means for applying a solder ring thereto, a cap feeding way, a slide disposed beneath said way, a feed dog pivoted upon said slide and extending upward through a slot in said way, and a spring for maintaining said dog in elevated position.

26. In a cap hemming machine, means for applying a solder ring thereto, a cap feeding way, a slide disposed beneath said way, a feed dog pivoted upon said slide and extending upward through a slot in said way, a feed dog pivoted upon said slide and provided with a horizontally extended free end, a tail carried by said dog, and an elevating spring bearing upon said tail.

27. In a cap hemming machine, a cap feeding way, a sliding carriage carrying feed dogs traveling in said way, a plate disposed above the path of travel of said dogs and provided with holding dogs, a rock shaft, and a crank arm carried by said rock shaft and disposed within a vertical way in said carriage.

28. In a cap hemming machine, oppositely disposed cap holding fingers, means for feeding a cap thereto, means for moving said fingers toward each other, a tension spring extending between said fingers, and means for automatically releasing said fingers from a cap.

29. In a cap hemming machine, oppositely disposed cap holding fingers, means for feeding a cap thereto, means for moving said fingers toward each other, and a reciprocating head provided with means to engage and release said fingers from a cap.

30. In a cap hemming machine, oppositely disposed cap holding fingers, means for feeding a cap thereto, means for moving said fingers toward each other, a reciprocating head provided with spaced sockets thereon, and releasing pins mounted in said sockets to engage and release said fingers.

31. In a cap hemming machine, oppositely disposed cap holding fingers, means for feeding a cap thereto, means for moving said fingers toward each other, a reciprocating head provided with spaced sockets thereon, releasing pins mounted in said sockets to engage and release said fingers, and a ring applying die carried by said head to operate after the release of the cap by said arms.

32. In a cap hemming machine, opposite bending dies, a supporting dial plate, means to permit a yielding of the lower die, and means for moving said dies toward and from each other.

33. In a cap hemming machine, opposite bending dies, a supporting dial plate, means for permitting a yielding of the lower die, a releasing plunger mounted in the upper die, tension means for projecting said plunger, and means for moving said dies toward and from each other.

34. In a cap hemming machine, opposite bending dies, a supporting dial plate, means for permitting a yielding of the lower die, a releasing plunger mounted in the upper die, tension means for projecting said plunger, means for limiting the travel of said lower die and plunger, and means for reciprocating said dies toward and from each other.

35. In a cap hemming machine, a dial plate provided with a supporting shoulder for a cap and ring, a reciprocating head, an upper die mounted therein and provided with a concave bending face and a central recess therein, a releasing plunger mounted in said recess, a tension spring disposed in said recess to contact with said plunger, and a coöperating opposite die.

36. In a cap hemming machine, a dial plate provided with a supporting shoulder for a cap and ring, an upper bending die, a coöperating bending die having a convex face, a reciprocating head provided with a spring chamber and recess therein, a stem from said coöperating die disposed in said recess, and a spring within said chamber to bear against the head of said coöperating die.

37. In a cap hemming machine, coöperating bending dies, a dial plate adapted to support a cap and ring in alinement with said dies, a reciprocating head carrying one of said dies, a rock shaft beneath said head provided with lifting cams, a crank arm carried by said shaft, a countershaft provided with a driving gear, a crank upon said countershaft connected with said crank arm, and a driving shaft provided with a gear meshing with the gear upon said countershaft.

38. In a cap hemming machine, means for supporting a cap and solder ring thereon, a movable lower die beneath said means, a reciprocating head above said means, a tubular post mounted upon said head, a die member slidingly mounted upon said post, and a tension spring for retaining said member in contact with a shoulder upon the post.

39. In a cap hemming machine, means for supporting a cap and solder ring thereon, a movable lower die beneath said means, a reciprocating head above said means, a tubular post mounted upon said head, a die member slidingly mounted upon said post, a tension spring for retaining said member in contact with a shoulder upon the post, a releasing plunger mounted within said post, and a spring disposed within said post to bear upon said plunger.

40. In a cap hemming machine, means for supporting a cap and solder ring thereon, opposite bending dies adapted to engage said cap and ring, and means for reciprocating one of said dies and oscillating it for delivery therefrom.

41. In a cap hemming machine, means for supporting a cap and solder ring thereon, opposite bending dies adapted to engage said cap and ring, a sliding block in which one of said dies is pivoted, a shaft beneath said block, and means carried by said shaft for reciprocating said block and oscillating said die.

42. In a cap hemming machine, means for supporting a cap and solder ring thereon, opposite bending dies adapted to engage said cap and ring, a sliding block in which one of said dies is pivoted, a shaft beneath said block, a cam carried by said shaft for raising said block, and a striker arm upon said shaft connected to oscillate said die in one direction.

43. In a cap hemming machine, means for supporting a cap and solder ring thereon, opposite bending dies adapted to engage said cap and ring, a sliding block in which one of said dies is pivoted, a shaft beneath said block, a cam carried by said shaft for raising said block, a lever loosely mounted upon said shaft and connected to said pivoted die, and a striker arm secured to said shaft to engage said lever in the oscillation of said shaft.

44. In a cap hemming machine, means for supporting a cap and solder ring thereon, opposite bending dies adapted to engage said cap and ring, a sliding block in which one of said dies is pivoted, a shaft beneath said block, a cam carried by said shaft for raising said block, a lever loosely mounted upon said shaft and connected to said pivoted die, a striker arm secured to said shaft to engage said lever in the oscillation of said shaft, and a spring connected to said pivoted die and block for restoring the former to vertical position.

45. In a cap hemming machine, means for supporting a cap and solder ring thereon, opposite bending dies adapted to engage said cap and ring, a sliding block in which one of said dies is pivoted, a shaft beneath said block, a cam carried by said shaft for raising said block, a lever loosely mounted upon said shaft and connected to said pivoted die, a striker arm secured to said shaft to engage said lever in the oscillation of said shaft, and a coiled restoring spring connected to the pivot of said die and to said block.

46. In a cap hemming machine, means for supporting a cap and solder ring thereon, coöperating bending dies, a sliding block in which one of said dies is pivotally mounted, means for raising said block in a vertical plane, means carried by said raising means for oscillating said pivoted die as the block approaches its lower position, and means for restoring said pivoted die to vertical position prior to the raising movement thereof.

47. In a cap hemming machine, means for supporting a cap and solder ring thereon, opposite bending dies, a sliding block in which one of said dies is pivotally mounted, curved guide faces upon said block and pivoted die, a shaft disposed beneath said block and provided with a raising cam, a lever loosely mounted upon said shaft, a link extended from said lever to said pivoted die, and a striker arm secured to said shaft to engage said lever during the travel of said cam.

48. In a cap hemming machine, a series of punching dies of different sizes, means for feeding a solder strip to said punches, a series of ring applying dies of different sizes, means for feeding a cap into alinement with said applying dies, a series of bending dies to secure said ring to said cap, a dial plate having a plurality of series of apertures therein disposed for alinement with each of said dies, and means for intermittently rotating said dial plate.

49. In a cap hemming machine, a series of punching dies of different sizes, means for feeding a solder strip to said punches, a series of ring applying dies of different sizes, means for feeding a cap into alinement with said applying dies, a series of bending dies to secure said ring to said cap, a dial plate having a plurality of series of apertures therein disposed for alinement with each of said dies, means for intermittently rotating said dial plate, and means for automatically discharging the completed article from one of said securing dies.

50. In a cap hemming machine, a reciprocating head, a main driving shaft connected to operate said head, a dial plate having a plurality of series of apertures therein and rotatably mounted beneath said head, a countershaft driven from said main shaft and carrying means for intermittently rotating said plate, a punching die carried by said head, an applying bending die carried by said head, a securing bending die carried by said head, a coöperating punching die slidingly mounted beneath said plate, means for raising said die, a bell crank lever actuated from said main shaft by an eccentric connection, a coöperating securing bending die beneath said plate, means for raising said die, connections from the raising means for said punch and securing dies to said bell crank lever, a coöperating applying bending die disposed beneath said plate, and means for raising said applying die operatively connected to a crank upon said countershaft.

51. In a cap hemming machine, a reciprocating head, a main driving shaft connected to operate said head, a dial plate having a plurality of series of apertures therein and rotatably mounted beneath said head, a countershaft driven from said main shaft and carrying means for intermittently rotating said plate, a punching die carried by said head, an applying bending die carried by said head, a securing bending die carried by said head, a coöperating punching die slidingly mounted beneath said plate, means for raising said die, a bell crank lever actuated from said main shaft by an eccentric connection, a coöperating securing bending die beneath said plate, means for raising said die, connections from the raising means for said punch and securing dies to said bell crank lever, a coöperating applying bending die disposed beneath said plate, means for raising said applying die operatively connected to a crank upon said countershaft, means for feeding a solder strip between the punching dies, a cam for actuating said feed means, an oscillating sector for driving said cam, and a crank upon said countershaft for actuating said sector.

52. In a cap hemming machine, a reciprocating head, a main driving shaft connected to operate said head, a dial plate, having a plurality of series of apertures therein and rotatably mounted beneath said head, a countershaft driven from said main shaft and carrying means for intermittently rotating said plate, a punching die carried by said head, an applying bending die carried by said head, a securing bending die carried by said head, a coöperating punching die slidingly mounted beneath said plate, means for raising said die, a bell crank lever actuated from said main shaft by an eccentric connection, a coöperating securing bending die beneath said plate, means for raising said die, connections from the raising means for said punch and securing dies to said bell crank lever, a coöperating applying bending die disposed beneath said plate, means for raising said applying die operatively connected to a crank upon said counter-shaft, means for feeding a solder strip between the punching dies, a cam for actuating said feed means, an oscillating sector for driving said cam, a crank upon said countershaft for actuating said sector, means for clamping said solder strip, a rock shaft connected to actuate said clamping means, a crank arm from said rock shaft, and a connection for said crank arm and an eccentric connection for the bell crank lever.

53. In a cap hemming machine, a reciprocating head, a main driving shaft connected to operate said head, a dial plate, having a plurality of series of apertures therein and rotatably mounted beneath said head, a countershaft driven from said main shaft and carrying means for intermittently rotating said plate, a punching die carried by said head, an applying bending die carried by said head, a securing bending die carried by said head, a coöperating punching die slidingly mounted beneath said plate, means for raising said die, a bell crank lever actuated from said main shaft by an eccentric connection, a coöperating securing bending die beneath said plate, means for raising said die, connections from the raising means for said punch and securing dies to said bell crank lever, a coöperating applying bending die disposed beneath said plate, means for raising said applying die operatively connected to a crank upon said counter-shaft, means for feeding a solder strip between the punching dies, a cam for actuating said feed means, an oscillating sector for driving said cam, a crank upon said countershaft for actuating said sector, means for clamping said solder strip, a rock shaft connected to actuate said clamping means, a crank arm from said rock shaft, a connection for said crank arm and an eccentric connection for the bell crank lever, a cap feeding arm, a rock shaft to which said arm is secured, and a gear upon said rock shaft meshing with a gear upon the shaft of said sector.

54. In a cap hemming machine, a reciprocating head, a main driving shaft connected to operate said head, a dial plate having a plurality of series of apertures therein and rotatably mounted beneath said head, a countershaft driven from said main shaft and carrying means for intermittently rotating said plate, a punching die carried by said head, an applying bending die carried by said head, a securing bending die carried by said head, a coöperating punching die slidingly mounted beneath said plate, means for raising said die, a bell crank lever actuated from said main shaft by an eccentric connection, a coöperating securing bending die beneath said plate, means for raising said die, connections from the raising means for said punch and securing dies to said bell crank lever, a coöperating applying bending die disposed beneath said plate, means for raising said applying die operatively connected to a crank upon said counter-shaft, means for feeding a solder strip between the punching dies, a cam for actuating said feed means, an oscillating sector for driving said cam, a crank upon said countershaft for actuating said sector, means for clamping said solder strip, a rock shaft connected to actuate said clamping means, a crank arm from said rock shaft, a connection for said crank arm and an eccentric connection for the bell crank lever, a cap feeding arm, a rock shaft to which said arm is secured, a gear upon said rock shaft meshing with a gear upon the shaft of said sector, means for supporting a cap in alinement with the applying dies, and means carried by said head for releasing said supporting means.

In testimony whereof we affix our signatures in presence of two witnesses.

GEZA HORVATH.
GEORGE E. GREEN.

Witnesses as to Horvath's signature.
  B. PRILCOZ,
  J. MISKOVIZ.
Witnesses as to Green's signature:
  M. J. GOMPERS,
  A. J. PORTER.